Mar. 6, 1923. Re. 15,559
G. E. WORTH
PRESS GUARD
Original Filed Dec. 24, 1919
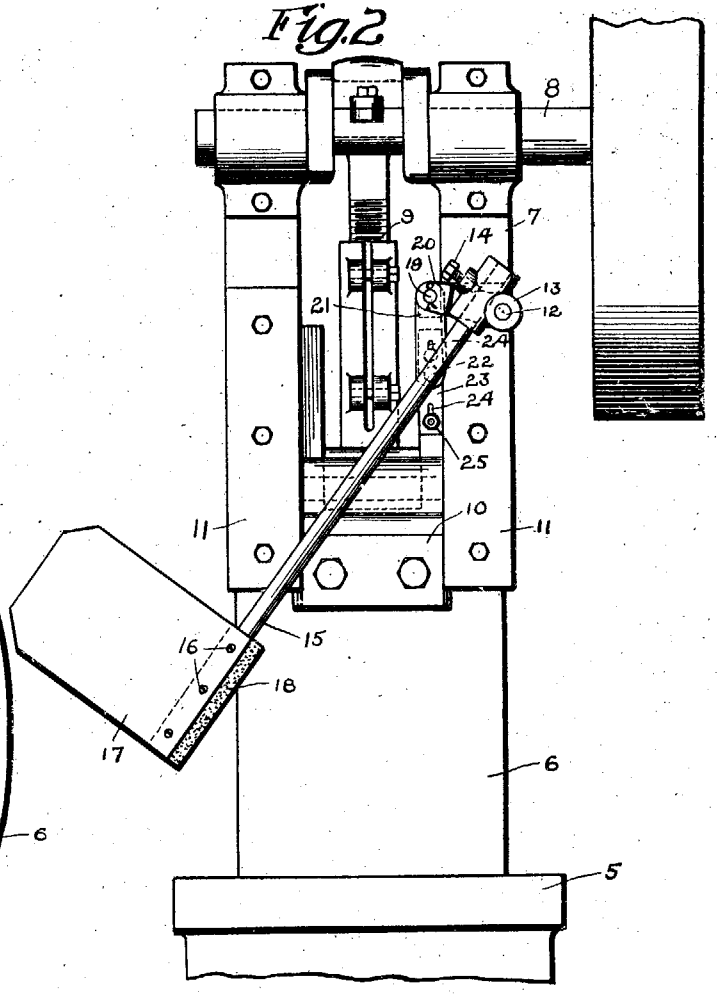
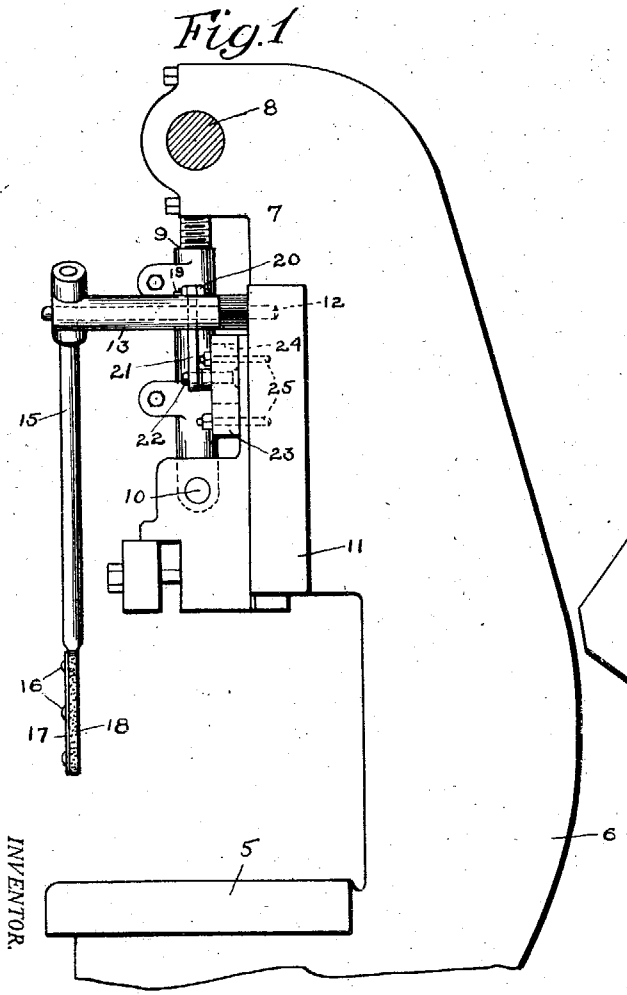
INVENTOR.
George E. Worth
BY
Frank Keifer
ATTORNEY Reissued Mar. 6, 1923. Re. 15,559

UNITED STATES PATENT OFFICE.

GEORGE E. WORTH, OF ROCHESTER, NEW YORK, ASSIGNOR TO FRANK KEIPER, OF ROCHESTER, NEW YORK.

PRESS GUARD.

Original No. 1,413,370, dated April 18, 1922, Serial No. 347,069, filed December 24, 1919. Application for reissue filed November 6, 1922. Serial No. 599,383.

*To all whom it may concern:*

Be it known that I, GEORGE E. WORTH, a citizen of the United States, residing at Rochester, in the county of Monroe and State of New York, have invented certain new and useful Improvements in Press Guards; and I do hereby declare the following to be a full, clear, and exact description of the same, reference being had to the accompanying drawings, forming a part of this specification, and to the reference numerals marked thereon.

This invention relates to press guards and, more particularly, to a safety guard for use on operative mechanism such, for example, as punch presses, the chief object of the invention being to provide a simple, efficient, durable and inexpensive device of the above character readily adaptable to machines of various constructions. To these and other ends the invention consists in certain improvements and combinations of parts, all as will be hereinafter more fully described, the novel features being pointed out in the claims at the end of the specification.

In the drawings:

Figure 1 is a side elevation of a machine having the present invention applied thereto, and Figure 2 is a front elevation of the same.

Similar reference numerals throughout the several views indicate the same parts.

The embodiment of the invention at present preferred as best illustrating the principles involved, is shown as applied to an ordinary punch press having a bed 5 and adjacent thereto a standard 6 supporting the upper jaw or head 7 in which is rotatably supported a crank shaft 8. A pitman 9 is rotatably connected with the crank shaft and adjustably connected with a ram 10 supported and guided for reciprocating movement on the head 7 by gibs 11.

Fixed on the standard and preferably on one of the gibs is a stud 12 on which is pivotally carried the guard hub 13 in a bore in which is slidably and adjustably secured by means of a set screw 14 a guard arm 15. At the other end of the latter is preferably secured by means of screws 16 a guard plate 17 between which and the arm is carried a cushioning member composed of relatively soft material 18 such as felt. The guard plate may, of course, have any desired shape and is preferably somewhat extended horizontally as shown in the drawings, the cushioning member being provided to prevent injury to the hand or other member of the operator as the guard is swung across the front of the bed upon the descent of the ram by means which will now be described.

The guard is preferably actuated by an adjustable connection with the moving part or ram of the press comprising a pin or stud 19 fixed on an arm 20 projecting from the guard hub 13 and having pivotally secured thereto a link 21 pivotally connected at its other end with a pin or stud 22 on a member adjustably secured to the ram. This adjustable member in the present instance comprises a block 23 having therein elongated openings or slots 24 engaging studs 25 fixed on the ram and provided with clamping nuts so that the block may be adjustably clamped to the ram. By the adjustment of the block it is apparent that the movement of the guard relative to the movement of the ram may be conveniently adjusted either to insure that the guard is actuated through a range of movement suitable for moving the hand of the operator out of the path of the ram, or, in case of the variation of the range of movement of the ram in accordance with the work being done on the press, to maintain a uniform actuation of the guard through the proper range of movement independently of the variation in the movement of the ram.

As is apparent from the description of its construction, the guard is swept across the front of the bed by its actuating connection with the movable part or ram and the cushioned part of the guard removes the hand of the operator from the path of the ram without damage to the hand while the guard plate 17 insures that the hand is maintained out of the path of danger. By adjustment of block 23 the movement of the guard may be conveniently adjusted to the machine or press for a uniform movement of the ram or when the movement of the ram is adjusted in accordance with the work the movement of the guard may be maintained uniform.

The construction of the device is exceedingly simple and its mode of operation efficient. Its construction adapts it for application to machines of various types, while the cost of production is obviously low.

It is also obvious that by the use of the upwardly extending link the pivot of the guard can be set high up on the frame of the press, and for this purpose a link of any desired length may be used, and this in turn increases the length of the guard arm and increases the length of the movement of the lower end of the guard with the same angular movement thereof, or decreases the angular movement of the guard with the same linear movement of the lower end of the guard, or decreases the angular movement as well as increases the linear movement of the lower end of the guard over what such movement would be if the pivot of the guard were lower down and on the same level with the driving member thereof, or approximately so.

I claim as my invention:

1. The combination with a machine having a frame and an operating part movable on said frame, of a member pivotally carried by the frame, a guard for said operating part having an arm connected with said member for longitudinal adjustment, an arm on said member, an element adjustably fixed on said operating part, and a link pivotally connected with the arm on said member and with said element.

2. The combination with a machine having a frame and an operating part movable on said frame, of a member pivotally carried by the frame, a guard for said operating part mounted on said member, an arm on said member extending transversely of the path of movement of said operating part, an element on said operating part, and a link actuated and controlled in its movement by a pivotal connection at one end with said element, and having a pivotal connection at its other end with the arm on said member.

3. The combination with a machine having a frame and an operating part movable on said frame, of a stud on said frame, a hub pivotally supported on the stud and formed with a socket, an arm longitudinally adjustable in said socket and carrying a guard for said operating part, an arm fixed on said hub and extending transversely of the path of movement of said operating part, a block adjustably fixed on said operating part, and a link pivotally connected at one end with said block and at the other with said hub arm.

4. In a guard for punch presses, the combination of an oscillating member pivoted to the frame of the press, a guard member carried by said oscillating member and adapted to swing in front of the dies of the press, an arm on said oscillating member, a member operating in said press with an up and down movement, said member having a pivot thereon, a link pivotally connected to said arm at its upper end, and to the pivot on the operating member at its lower end, permitting the swinging of the guard from a point above the pivot on the operating member, whereby the up and down movement of the operating member is adapted to cause the guard to swing forward and back in front of the dies.

5. In a guard for punch press, the combination of an oscillating member pivoted to the frame of the press, a guard member carried by said oscillating member and adapted to swing in front of the dies of the press, an arm on said oscillating member, a member operating in said press with an up and down movement, said member having a pivot thereon, a link pivotally connected to said arm at its upper end, and to the pivot on the operating member at its lower end, permitting the swinging of the guard from a point above the pivot on the operating member, whereby the up and down movement of the operating member is adapted to cause the guard to swing forward and back in front of the dies, said pivot on the operating member being adjustable up and down.

6. In a guard for a punch press, the combination of an oscillating member pivoted to the frame of the press, a guard member carried by said oscillating member and adapted to swing in front of the dies of the press, a member operating in said press with an up and down movement, said member having a pivot thereon, a link pivotally connected to said oscillating member at its upper end and to the pivot on the operating member at its lower end, permitting the swinging of the guard from a point above the pivot on the operating member whereby the up and down movement of the operating member is adapted to cause the guard to swing forward and back in front of the dies.

In testimony whereof I affix my signature.

GEORGE E. WORTH.